Dec. 19, 1944.  L. A. HERMITTE  2,365,551
DEVICE FOR STARTING GAS TURBINE MOTOR PLANTS
Filed Jan. 26, 1942
Fig. 1
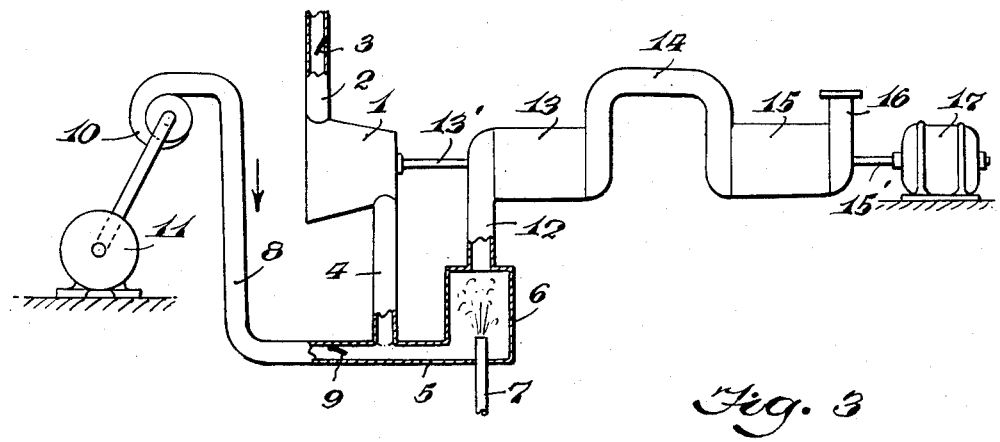
Fig. 2
Fig. 3
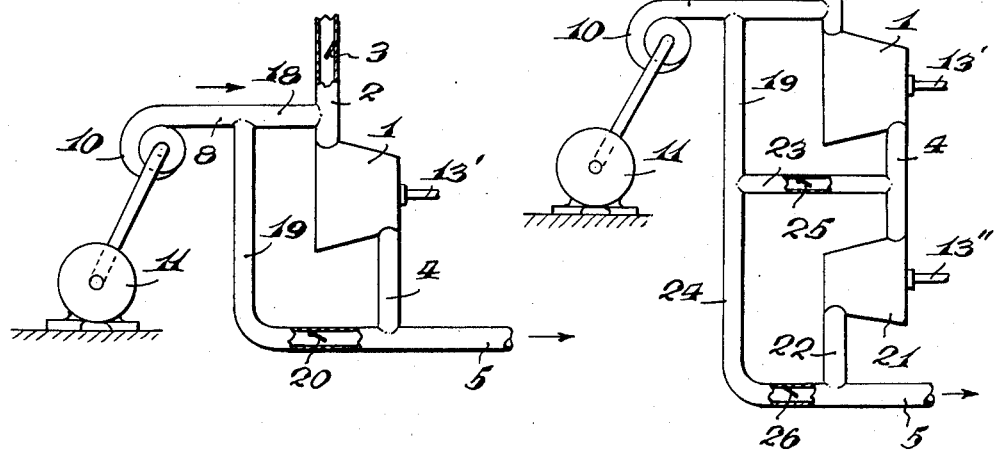
Inventor
Louis Armand Hermitte,
By [signature]
Attorney.

Patented Dec. 19, 1944

2,365,551

UNITED STATES PATENT OFFICE 2,365,551

DEVICE FOR STARTING GAS TURBINE MOTOR PLANTS

Louis Armand Hermitte, La Courneuve, France; vested in the Alien Property Custodian Application January 26, 1942, Serial No. 428,305
In France March 1, 1941

2 Claims. (Cl. 230—45)

This invention relates to a compressor device which is intended more particularly for use with motor turbines, and its novelty resides in the means provided for starting the operation of the device. According to the invention, the power necessary for starting is supplied in the form of pneumatic energy which may be furnished by an auxiliary fan driven by any suitable source of power.

In the drawing:

Fig. 1 is a diagrammatic illustration of one embodiment of the invention.

Fig. 2 is a diagrammatic illustration of another form.

Fig. 3 illustrates a third form.

As illustrated in Fig. 1, the compressor 1 has an air intake pipe 2 with a check-valve 3, and a discharge pipe 4 connected by a pipe 5 with a combustion chamber 6 to which fuel is supplied by a pipe 7. A pipe 8 also is connected with the chamber 6 by the pipe 5, has a check valve 9 and is the discharge pipe of an auxiliary fan 10 driven by an electric motor 11. The heated air is conducted from the combustion chamber 6 through a pipe 12 to the intake of an auxiliary turbine 13 which drives the compressor 1 by its shaft 13'. The air passes from the discharge of the auxiliary turbine 13 through a pipe 14 to the intake of a motive turbine 15 from which it is discharged through a pipe 16. The motive turbine 15 drives a generator 17 by its shaft 15'.

As illustrated in Fig. 2, the discharge pipe 8 of the auxiliary fan 10 has two branches 18 and 19, the former 18 being connected with the intake pipe 2 of the compressor 1 between the check-valve 3 and the compressor 1, and the latter 19 being connected with the pipe 5 leading to the combustion chamber 6. The branch 19 has a check-valve 20.

As illustrated in Fig. 3, the discharge pipe 4 of the compressor 1 is connected with the intake of a second and smaller compressor 21 which is driven by a shaft 13" actuated by the auxiliary turbine 13 in any suitable manner, and having its discharge pipe 22 connected with the pipe 5 to the combustion chamber 6. In this form of the device, the pipe 8 has its branch 18 connected with the pipe 2 of the compressor 1, as shown in Fig. 2. The branch 19 has two branches 23 and 24, the former 23 being connected with the pipe 5 and having a check-valve 26.

In the form of the device illustrated in Fig. 1, the fan 10 driven by the motor 11 supplies air through pipes 8 and 5 to the combustion chamber 6 where it is heated and whence it passes through pipe 12 to the auxiliary turbine 13. The turbine 13, thus energized, drives the compressor 1 which sucks air through pipe 2, the check valve 3 opening, and discharges the air through pipe 4 to pipe 5 and the chamber 6. When the pressure of the compressor 1 exceeds the pressure of the fan 10, the check valve 9 closes and the fan 10 is stopped.

In the form of the device illustrated in Fig. 2, the air from fan 10 passes through pipe 8 to its branches 18 and 19. Before the compressor 1 has been started, substantially all of this air passes through branch 19 to pipe 5 and combustion chamber 6, as in the form of Fig. 1, because of the resistance of compressor 1 before it begins to operate. When the compressor 1 starts, some of the air from the fan 10 passes through branch 18 into the compressor 1, the valve 3 preventing escape of the air. When the pressure of the compressor 1 exceeds the pressure of the fan 10, the check-valve 20 closes and all of the air from fan 10 passes through the compressor 1, the valve 3 preventing escape. When the fan 10 is stopped, cutting off pressure in pipe 18, the check-valve 3 opens to allow the compressor 1 to suck in air through pipe 2.

In the form of the device illustrated in Fig. 3, the air from the fan 10 passes through pipe 8 to its branches 18 and 19, and the branches 23 and 24 of branch 19. Substantially all of this air passes through branch 24 to pipe 5 and chamber 6, as in the forms illustrated in Figs. 1 and 2. The compressor 21, being the smaller, starts to operate before the compressor 1, and when pressure in pipe 22 exceeds pressure in branch 24, the valve 26 closes. When pressure from the compressor 1 through its pipe 4 exceeds pressure in branch 23, the valve 25 closes, and all the air from the fan 10 passes through branch 18 and the compressors 1 and 21, valve 3 preventing escape. When fan 10 is stopped, the air is supplied to the compressors 1 and 21 through pipe 2, the valve 3 opening.

What is claimed is:

1. In a compressor device, the combination of an air compressor, a check valve mounted on the suction end of the compressor between the atmosphere and the compressor and opening towards the compressor when the latter sucks in a sufficient quantity of air, an auxiliary fan, a first conduit connecting the delivery of the fan to the suction of the compressor between the check valve and the compressor, a second conduit connecting the delivery of the fan with the delivery of the compressor, a check valve mounted in the second conduit and opening towards the delivery of the compressor and closing when the air pressure furnished by the compressor is greater than that supplied by the fan, and a motor for driving the fan.

2. In a compressor device, the combination of two compressors mounted in series, a starting fan connected in series-parallel with each of the compressors, a check valve set on the compressor end sucking in atmospheric air, a check valve mounted on each one of the connections between the delivery end of the fan and the delivery end of each one of the compressors, and a motor for driving the fan.

LOUIS ARMAND HERMITTE.